United States Patent
Petovello et al.

(10) Patent No.: US 7,679,551 B2
(45) Date of Patent: Mar. 16, 2010

(54) METHODS AND SYSTEMS FOR DOPPLER FREQUENCY SHIFT REMOVAL AND CORRELATION FOR SOFTWARE-BASED RECEIVERS

(75) Inventors: Mark Gregory Petovello, Calgary (CA); Gérard Lachapelle, Calgary (CA)

(73) Assignee: UTI Limited Partnership, Calgary, Alberta (CA)

( * ) Notice: Subject to any disclaimer, the term of this patent is extended or adjusted under 35 U.S.C. 154(b) by 91 days.

(21) Appl. No.: 11/805,718

(22) Filed: May 23, 2007

(65) Prior Publication Data
US 2008/0007448 A1    Jan. 10, 2008

Related U.S. Application Data

(60) Provisional application No. 60/803,075, filed on May 24, 2006.

(51) Int. Cl.
*G01S 1/02* (2006.01)
(52) U.S. Cl. .............. 342/357.02; 342/357.05; 342/357.06
(58) Field of Classification Search ............ 342/357.02, 342/357.05, 357.06, 357.12, 357.13; 701/207, 701/213; 702/106
See application file for complete search history.

(56) References Cited

U.S. PATENT DOCUMENTS

| | | | |
|---|---|---|---|
| 5,223,843 A * | 6/1993 | Hutchinson | 342/352 |
| 6,804,290 B1 * | 10/2004 | King et al. | 375/142 |
| 7,010,060 B2 | 3/2006 | Ledvina et al. | |
| 2002/0126644 A1 * | 9/2002 | Turpin et al. | 370/342 |
| 2003/0201935 A1 * | 10/2003 | King et al. | 342/357.15 |
| 2005/0254560 A1 * | 11/2005 | Huang | 375/150 |
| 2006/0074558 A1 * | 4/2006 | Williamson et al. | 701/213 |
| 2006/0082496 A1 * | 4/2006 | Winternitz et al. | 342/357.06 |

OTHER PUBLICATIONS

International Search Report and Written Opinion, Application No. PCT/CA2007/000933, dated Aug. 15, 2007.
C. Ma et al., "Implementation of a Software GPS Receiver," Proceedings of ION GNSS 2004, Session A3, Long Beach, CA, Sep. 21-24, 2004, pp. 1-15.
M. G. Petovello et al., "An Efficient New Method of Doppler Removal and Correlation with Application to Software-Based GNSS Receivers," Proceedings of GNSS06, Fort Worth, Sep. 26-29, 2006, Session C5, The Institute of Navigation, pp. 1-11.

* cited by examiner

*Primary Examiner*—Dao L Phan
(74) *Attorney, Agent, or Firm*—Fulbright & Jaworski L.L.P.

(57) ABSTRACT

Embodiments of the invention provide a method for effecting Doppler removal and correlation for software-based receivers. For one embodiment of the invention Doppler removal is performed concurrently for all received communications signals. For one embodiment of the invention, a single frequency selected to effect Doppler removal, multiple communications signals having Doppler frequency shift are received from corresponding communications signal sources, and a Doppler removal process is performed concurrently for each received communication signal. A correlation process is then performed, the correlation process having an integration interval divided into multiple sub-intervals.

21 Claims, 4 Drawing Sheets

METHODS AND SYSTEMS FOR DOPPLER FREQUENCY SHIFT REMOVAL AND CORRELATION FOR SOFTWARE-BASED RECEIVERS

CLAIM OF PRIORITY

This application is a non-provisional application claiming priority to provisional application Ser. No. 60/803,075, filed on May 24, 2006, entitled "A NEW METHOD OF DOPPLER REMOVAL AND CORRELATION FOR SOFTWARE RECEIVERS" which is herein incorporated by reference in its entirety.

FIELD

Embodiments of the invention relate to communications systems employing spread spectrum techniques, more specifically, the present invention relates to methods and systems for effecting reduction/removal of Doppler Frequency shift in communications system receivers.

BACKGROUND

Many communications systems, for example, Global Navigation Satellite System (GNSS) use spread spectrum communication signals. Spread-spectrum communication systems use a synchronized version of a spreading code to demodulate the received signal. Such systems often require a process for reducing or removing Doppler frequency shift. A Doppler frequency shift is the change in apparent frequency of a source of electromagnetic radiation when there is a relative motion between the signal source and the receiver that is attempting to synchronize with a spread-spectrum communications system.

For example, GNSS receivers generate a local signal within the receiver that matches the carrier frequency, and, optionally, the phase, of the incoming signal. The two signals, the local and incoming, are then effectively multiplied together to effect carrier removal. If the frequency of the local signal matches that of the incoming signal's apparent carrier frequency, the result of the Doppler removal process contains no carrier frequency component and consists entirely of the ranging code. This signal is then multiplied by time-shifted versions of the local replica of the ranging code. This process is known as correlation. The term "Doppler removal" is used herein to describe the carrier removal process that accounts for the combination of the nominal incoming carrier frequency, and possibly any or all Doppler frequency shifts.

For software-based GNSS receivers, the Doppler removal and correlation process is computationally very expensive. Conventional Doppler removal is effected for each Satellite being tracked (i.e. Doppler removal is performed on a satellite-by-satellite basis).

Basic GNSS Receiver Operation

FIG. 1 illustrates a GNSS receiver as known in the prior art. Receiver 100, as shown in FIG. 1, includes an antenna 105 that receives GNSS communication signals from multiple satellites (not shown). The signals are down-converted to a lower intermediate frequency (IF) by the RF front end 110. This lower frequency signal (IF signal) is then sampled at a rate of $f_s$ by the analog to digital converter (ADC) 115. The output samples, herein referred to as IF samples, can be real-valued or in quadraphase (I and Q).

The IF samples are then passed to up to multiple tracking channels shown for example as tracking channels 1-Z, where Z is defined by the number of satellites currently in view, or the maximum number of channels that can be accommodated by the receiver. The measurements output from the tracking channels are passed to a navigator 120 that can compute the position and/or the velocity of the antenna.

FIG. 2 illustrates a functional block diagram of a basic tracking channel in accordance with the prior art. Tracking channel 200, shown in FIG. 2, includes a Doppler removal module 205 that receives the IF samples from the ADC 115. The IF samples are multiplied by the sine and cosine of a locally generated carrier phase signal that is generated by the Carrier Numerically Controlled Oscillator (NCO) 210. The output from the Doppler removal module is passed to one or more correlators 215. Each correlator 215 multiplies the samples from the Doppler removal module 205 by a locally generated version of the ranging code, generated by a coder driven by the code NCO 220 and accumulates the results over some predefined time interval. The processor 225 performs multiple tasks including determining the error in the locally generated carrier and code and providing correction signals to the respective NCOs.

Received Signal as Seen by Tracking Channels

The IF samples output from the ADC 115 of FIG. 1 contain a superposition of signals from all satellites in view of the antenna. However, since each tracking channel is responsible for tracking the signal of a given satellite, and because GNSS systems are inherently designed to minimize problems introduced by receiving signals from multiple satellites simultaneously, the discussion can be simplified to consider only one satellite's signal at a time. With this in mind, the incoming signal is assumed to have a center frequency of $f_{IF}$ Hz and thus the quadraphase samples can then be expressed as $$I_k = A_k \cdot C_k \cdot D_k \cdot \cos(2\pi f_{IF} T_s k + \phi) \qquad (1)$$

$$Q_k = A_k \cdot C_k \cdot D_k \cdot \sin(2\pi f_{IF} T_s k + \phi) \qquad (2)$$

where the subscript k refers to the epoch; A is the signal amplitude; C is the ranging code; D is the navigation data bit; $T_s = f_s^{-1}$ is the sample period; and $\phi$ is the phase. It is also noted that the center frequency also contains Doppler shifts introduced by receiver motion, satellite motion and any time varying range errors due, for example, to atmospheric effects. For real-valued IF samples, the corresponding equation is the same as equation (1). The following sections describe the traditional methods of Doppler removal and code correlation.

Doppler Removal

Doppler removal has traditionally been done in one of two ways. The first method uses a rigorously generated local carrier. The second method uses a lookup table of locally generated signals at a limited number of frequencies.

Rigorous Method

The signals in equations (1) and (2) are first rotated as follows $$\begin{aligned}I_k^a &= I_k \cdot \cos(2\pi \hat{f} T_s k + \hat{\varphi}) + Q_k \cdot \sin(2\pi \hat{f} T_s k + \hat{\varphi}) \\ &= A_k \cdot C_k \cdot D_k \cdot \left\{ \begin{array}{l} \cos(2\pi f_{IF} T_s k + \varphi) \cdot \cos(2\pi \hat{f} T_s k + \hat{\varphi}) + \\ \sin(2\pi f_{IF} T_s k + \varphi) \cdot \sin(2\pi \hat{f} T_s k + \hat{\varphi}) \end{array} \right\} \\ &= A_k \cdot C_k \cdot D_k \cdot \cos(2\pi (f_{IF} - \hat{f}) T_s k + (\varphi - \hat{\varphi})) \\ &= A_k \cdot C_k \cdot D_k \cdot \cos(2\pi \delta f T_s k + \delta \varphi)\end{aligned} \qquad (3)$$

-continued $$Q_k^a = -I_k \cdot \sin(2\pi \hat{f} T_s k + \hat{\varphi}) + Q_k \cdot \cos(2\pi \hat{f} T_s k + \hat{\varphi}) \quad (4)$$

$$= A_k \cdot C_k \cdot D_k \cdot \left\{ \begin{array}{l} -\cos(2\pi f_{IF} T_s k + \varphi) \cdot \sin(2\pi \hat{f} T_s k + \hat{\varphi}) + \\ \sin(2\pi f_{IF} T_s k + \varphi) \cdot \cos(2\pi \hat{f} T_s k + \hat{\varphi}) \end{array} \right\}$$

$$= A_k \cdot C_k \cdot D_k \cdot \sin(2\pi (f_{IF} - \hat{f}) T_s k + (\varphi - \hat{\varphi}))$$

$$= A_k \cdot C_k \cdot D_k \cdot \sin(2\pi \delta f T_s k + \delta \varphi)$$

where $\hat{f}(=f_{IF}-\delta f)$ and $\hat{\varphi}$ are the locally generated frequency and phase; and $\delta f$ and $\delta \varphi$ are their respective (tracking) errors. As can seen, if the frequency is perfectly replicated, the resulting signal contains no frequency components, since $\delta \varphi$ is constant. Equations (3) and (4) represent the output of the Doppler removal process.

For real-valued IF samples, the Doppler removal process is accomplished using $$I_k^a = I_k \cdot 2 \cdot \cos(2\pi \hat{f} T_s k + \hat{\varphi}) \quad (5)$$

$$= A_k \cdot C_k \cdot D_k \cdot 2 \cdot \cos(2\pi f_{IF} T_s k + \varphi) \cdot \cos(2\pi \hat{f} T_s k + \hat{\varphi})$$

$$= A_k \cdot C_k \cdot D_k \cdot \cos(2\pi \delta f T_s k + \delta \varphi) + A_k \cdot C_k \cdot D_k \cdot$$

$$\sin(2\pi (f_{IF} + \hat{f}) T_s k + \delta \varphi)$$

$$Q_k^a = I_k \cdot 2 \cdot \sin(2\pi \hat{f} T_s k + \hat{\varphi}) \quad (6)$$

$$= A_k \cdot C_k \cdot D_k \cdot 2 \cdot \cos(2\pi f_{IF} T_s k + \varphi) \cdot \sin(2\pi \hat{f} T_s k + \hat{\varphi})$$

$$= A_k \cdot C_k \cdot D_k \cdot \sin(2\pi \delta f T_s k + \delta \varphi) + A_k \cdot C_k \cdot D_k \cdot$$

$$\cos(2\pi (f_{IF} + \hat{f}) T_s k + \delta \varphi)$$

The above results are equivalent to the quadraphase case, but with one additional term in each equation. It is worth noting that this extra term has approximately twice the frequency of the original IF signal (since the locally generated signal is expected to closely match the IF signal). The influence of these terms will be minimized through a subsequent correlation process and thus no serious degradation in system performance is realized.

Table Method

The Table Method employs a lookup table of locally generated signals at a limited number of frequencies instead of generating the local carrier at the desired Doppler (which can be computationally expensive). Using the Table Method, the sine and cosine of signals of various frequencies is stored such that they need not be recomputed. In this case, the frequency error term ($\delta f$) in equations (3) and (4) contains not only the tracking error, but also an error due to having limited frequency resolution. Mathematically, the locally generated frequency can be written as $$f = f_{IF} - \delta f - \delta f_T$$

where $\delta f_T$ is the error introduced by using a quantized frequency. As such, the final forms of equations (3) and (4) can be rewritten as $$I_k^a = A_k \cdot C_k \cdot D_k \cdot \cos(2\pi \delta f T_s k + 2\pi \delta f_T T_s k + \delta \varphi) \quad (7)$$

$$Q_k^a = A_k \cdot C_k \cdot D_k \cdot \sin(2\pi \delta f T_s k + 2\pi \delta f_T T_s k + \delta \varphi) \quad (8)$$

Correlation

The correlation process is performed as follows $$I^b = \sum_{k=1}^{N} \hat{C}_k \cdot I_k^a \quad (9)$$

$$Q^b = \sum_{k=1}^{N} \hat{C}_k \cdot Q_k^a \quad (10)$$

where $\hat{C}_k$ is the locally generated code; and N is the number of samples. If the summation is performed during the same data bit, the $D_k$ term can be ignored. Assuming the Doppler removal was done using the rigorous method, equations (9) and (10) can be approximated by $$I^b \approx A \cdot R(\delta \tau) \cdot \frac{\sin(\pi \delta f T_s N)}{\pi \delta f T_s} \cdot \cos(\pi \delta f T_s N + \delta \varphi) \quad (11)$$

$$Q^b \approx A \cdot R(\delta \tau) \cdot \frac{\sin(\pi \delta f T_s N)}{\pi \delta f T_s} \cdot \sin(\pi \delta f T_s N + \delta \varphi) \quad (12)$$

where $R(\delta \tau)$ is the ranging code auto-correlation function with an error in the locally generated code of $\delta \tau$. Similarly, if the table method was used, the approximations are as follows $$I^b \approx A \cdot R(\delta \tau) \cdot \frac{\sin(\pi (\delta f + \delta f_T) T_s N)}{\pi (\delta f + \delta f_T) T_s} \cdot \cos(\pi \delta f T_s N + \pi \delta f_T T_s N + \delta \varphi) \quad (13)$$

$$Q^b \approx A \cdot R(\delta \tau) \cdot \frac{\sin(\pi (\delta f + \delta f_T) T_s N)}{\pi (\delta f + \delta f_T) T_s} \cdot \sin(\pi \delta f T_s N + \pi \delta f_T T_s N + \delta \varphi) \quad (14)$$

However, since $\delta f_T$ is known (recall it is the difference between the frequency in the table and the frequency that was intended to be generated) the above values can be rotated (by $\pi \delta f_T T_s N$) as follows $$\tilde{I}^b = I^b \cdot \cos(\pi \delta f_T T_s N) + Q^b \cdot \sin(\pi \delta f_T T_s N) \quad (15)$$

$$= A \cdot R(\delta \tau) \cdot \frac{\sin(\pi (\delta f + \delta f_T) T_s N)}{\pi (\delta f + \delta f_T) T_s} \cdot \cos(\pi \delta f T_s N + \delta \varphi)$$

$$\tilde{Q}^b = -I^b \cdot \sin(\pi \delta f_T T_s N) + Q^b \cdot \cos(\pi \delta f_T T_s N) \quad (16)$$

$$= A \cdot R(\delta \tau) \cdot \frac{\sin(\pi (\delta f + \delta f_T) T_s N)}{\pi (\delta f + \delta f_T) T_s} \cdot \sin(\pi \delta f T_s N + \delta \varphi)$$

Comparing equations (15) and (16) with (11) and (12), the only difference is in the quotient term. Since this term acts as an attenuating factor that decreases (in magnitude) with total frequency error and/or integration time ($T_s N$), the table method will typically have slightly more attenuation than the rigorous method. This is because, generally speaking, frequency error due to frequency quantization will be non-zero. However, if the frequency quantization is small enough, the extra attenuation can be considered negligible.

The attenuation factor discussed above is also the reason that when using real-valued IF samples, the additional terms in equations (5) and (6) have minimal influence on overall performance. Specifically, since the large frequency "error" in these terms (which is approximately twice the IF frequency) will have a correspondingly small (in magnitude) attenuation factor.

As a final note, the rotation performed in equations (15) and (16) should also account for the fact that the stored frequency tables generally start at zero phase but that during any given accumulation time interval, the locally generated phase will generally not start with zero phase.

Computational Complexity

It is useful to quantify the computational aspects of the traditional algorithms. The focus here will be on the table method since this method is computationally more efficient with only negligible disadvantages (if implemented properly). To quantify the computational complexity, only multiplications and additions are considered. Computation of the transcendental functions is not included in this calculation since in the table method these values are computed once and read from the lookup table.

Referring to the top line of equations (3) and (4), the Doppler removal process requires 4N multiplications and 2N additions. From equations (9) and (10), the correlation process requires 2N multiplications and 2N additions. However, for the table method, an additional four multiplications and two additions are needed for the rotation in equations (15) and (16). The total number of computations required for tracking K satellites using L correlators is summarized in Table 1.

TABLE 1

Number of Computations Required For Table Method Doppler Removal and Correlation (Assuming K Satellites and L Correlators per Satellite)

| Process | Multiplications | Additions |
| --- | --- | --- |
| Doppler Removal | 4NK | 2NK |
| Correlation | (2N + 4)KL | (2N + 2)KL |

As a final note, for real-valued IF samples Table 1 remains virtually unchanged except that there are only 2NK multiplications and NK additions required for the Doppler removal process.

SUMMARY OF THE INVENTION

Embodiments of the invention provide a method for effecting Doppler removal and correlation for software-based receivers. For one embodiment of the invention Doppler removal is performed concurrently for all received communications signals.

For one embodiment of the invention, a single frequency is selected to effect Doppler removal, multiple communications signals having Doppler frequency shift are received from corresponding communications signal sources, and a Doppler removal process is performed concurrently for each received communication signal. A correlation process is then performed, the correlation process having an integration interval divided into multiple sub-intervals.

Other advantages and embodiments will be described in the detailed description.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
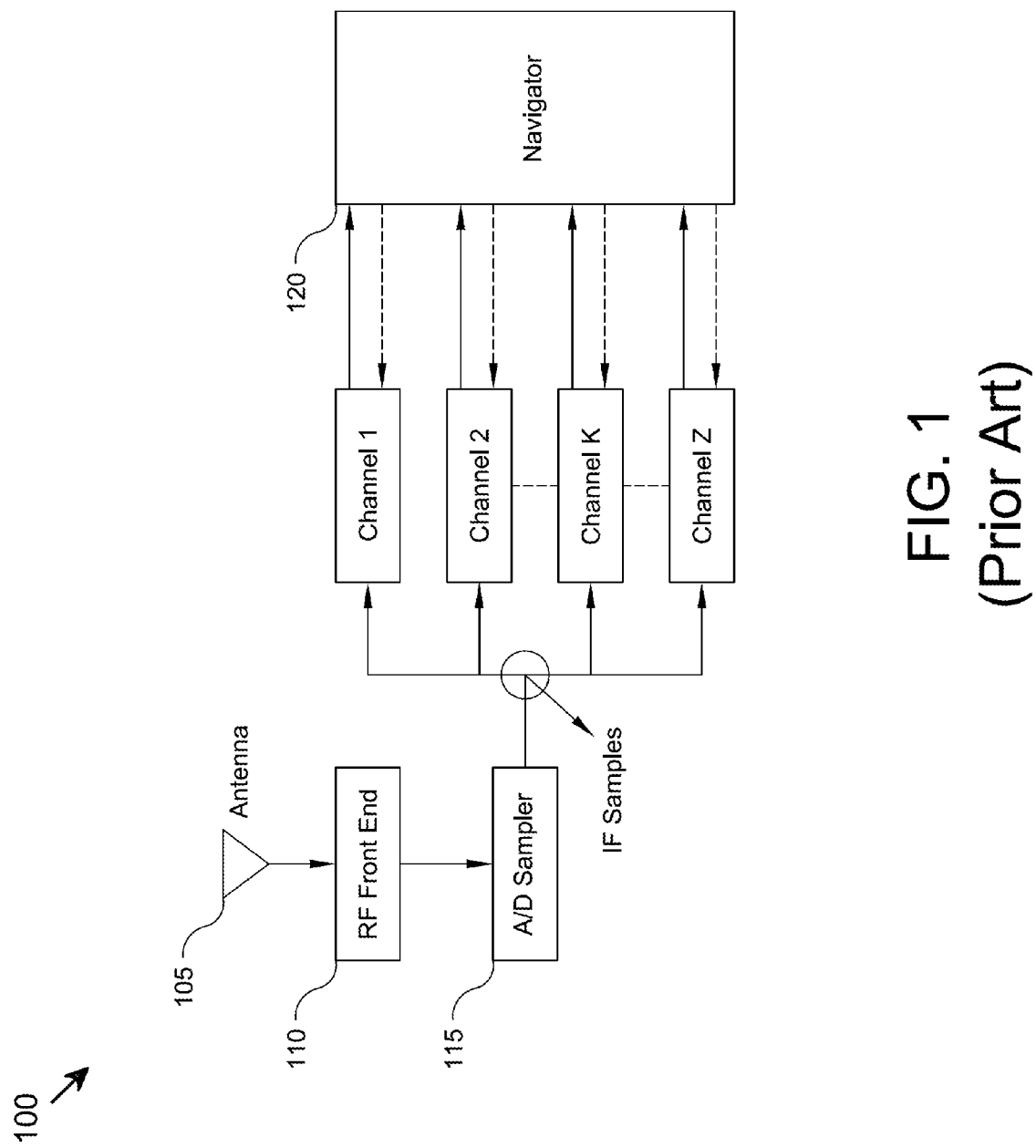
FIG. 1 illustrates a GNSS receiver as known in the prior art.

A method and system for effecting Doppler removal and correlation. For one embodiment of the invention Doppler removal is performed concurrently for all received communications signals. For one embodiment of the invention in which the received signals are GNSS signals, Doppler removal is performed concurrently for all satellites being tracked.

Those of ordinary skill in the art will realize that the following detailed description of various embodiments of the invention is illustrative only and is not intended to be in any way limiting. Other embodiments of the invention will readily suggest themselves to such skilled persons having the benefit of this disclosure. It will be apparent to one skilled in the art that these specific details may not be required to practice embodiments of the invention. In other instances, well-known elements and devices are shown in block diagram form to avoid obscuring the invention. In the following description of the embodiments, substantially the same parts are denoted by the same reference numerals.

In the interest of clarity, not all of the features of the implementations described herein are shown and described. It will, of course, be appreciated that in the development of any such actual implementation, numerous implementation-specific devices must be made in order to achieve the developer's specific goals, wherein these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with an embodiment of the invention, the components, process steps, and/or data structures may be implemented using various types of operating systems, computing platforms, computer programs, and/or general purpose machines. In addition, those of ordinary skill in the art will recognize that devices of a less general purpose nature may also be used without departing from the scope and spirit of the inventive concepts disclosed herein.

While particular embodiments of the invention have been shown and described, it will now be apparent to those skilled in the art having the benefit of this disclosure that many more modifications than mentioned above are possible without departing from the inventive concepts disclosed herein. Moreover, inventive aspects lie in less than all features of a single disclosed embodiment. Thus, the claims following the Detailed Description are hereby expressly incorporated into this Detailed Description, with each claim standing on its own as a separate embodiment of this invention.

Doppler Removal

As noted above, embodiments of the invention effect Doppler removal concurrently for multiple received communications signals. For one embodiment of the invention, the Doppler removal process is implemented as a table method using a generated lookup table consisting of a single frequency. Since Doppler removal will be performed for all received communications signals using this frequency, the Doppler removal process need only be performed once for all received communications signals.

Figure 3:
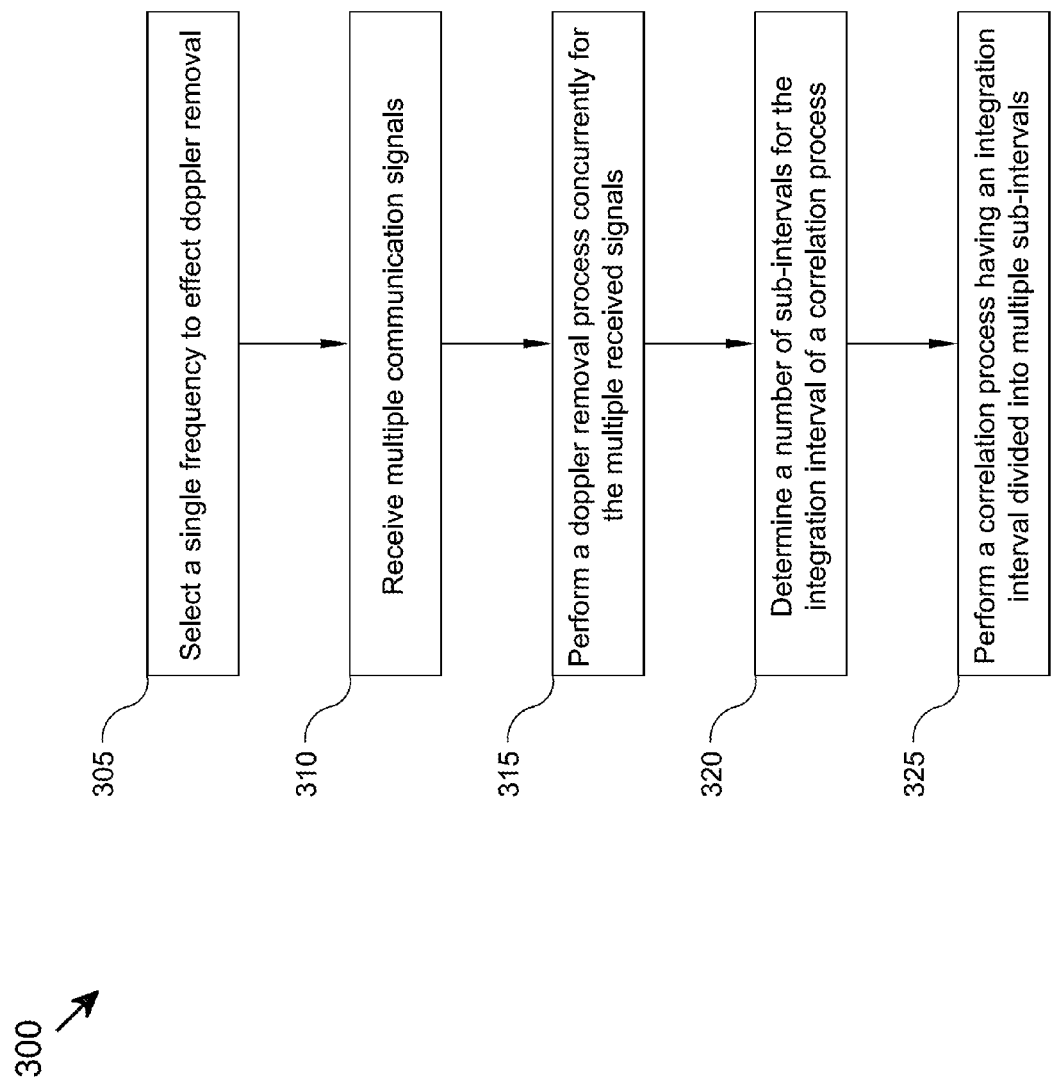
FIG. 3 illustrates a process to effect Doppler removal and correlation of communications signals in accordance with one embodiment of the invention.

FIG. 3 illustrates a process to effect Doppler removal and correlation of communications signals in accordance with one embodiment of the invention. Process 300, shown in FIG. 3, begins at operation 305 in which a single frequency is selected to effect Doppler removal. For one embodiment, the single frequency Doppler removal lookup table is generated for the selected frequency. For one such embodiment, the frequency for which the lookup table is generated may be predefined or may be determined dynamically depending upon the frequency of received communications signals. For one embodiment of the invention, the single frequency Doppler removal lookup table is generated initially and then used repeatedly to effect Doppler removal. That is, a single frequency Doppler removal lookup table need only be generated once.

At operation 310 multiple communication signals having Doppler frequency shift are received. For example, for an embodiment in which the communications signals are GNSS communications signals, the received communications signals may be from multiple corresponding satellites.

At operation 315 a Doppler removal process is performed concurrently for all received communications signals. For one such embodiment, the received communications signals are concurrently downconverted and processed by a digital processing system (DPS) capable of processing multiple signals in parallel.

Correlation

Embodiments of the invention may implement a table method correlation process in which the integration interval is divided into multiple sub-intervals. As discussed above, for the prior art correlation process the quotient term in equations (15) and (16) acts as an attenuation factor that decreases (in magnitude) with total frequency error and/or integration time ($T_s N$). Furthermore, since the Doppler range in low-dynamic GPS applications is ±5 kHz, this also represents the largest frequency table error, $\delta f_T$, assuming the table is generated for the center frequency (higher dynamic applications can also be considered where the Doppler spans a wider range of values). For typical integration times of 1 ms or longer, a 5 kHz frequency error will result in an unacceptable level of attenuation and thus tracking error. To compensate for this, embodiments of the invention divide the integration interval into multiple sub-intervals. Referring again to FIG. 3, a number of sub-intervals may be determined for the integration interval of a correlation process at operation 320. At operation 325, a correlation process having an integration interval divided into multiple sub-intervals is performed. For one such embodiment of the invention, the integrations interval is divided into M sub-intervals as follows $$I^b = \sum_{k=1}^{N} \hat{C}_k \cdot I_k^a \qquad (17)$$

$$= \sum_{k=1}^{N/M} \hat{C}_k \cdot I_k^a + \sum_{k=1}^{N/M} \hat{C}_{k+\frac{N}{M}} \cdot I_{k+\frac{N}{M}}^a + \cdots +$$

$$\sum_{k=1}^{N/M} \hat{C}_{k+\frac{(M-1)N}{M}} \cdot I_{k+\frac{(M-1)N}{M}}^a$$

$$= \sum_{n=1}^{M} \left\{ \sum_{k=1}^{N/M} \hat{C}_{k+\frac{(n-1)N}{M}} \cdot I_{k+\frac{(n-1)N}{M}}^a \right\}$$

$$= \sum_{n=1}^{M} I_n^b$$

$$Q^b = \sum_{k=1}^{N} \hat{C}_k \cdot Q_k^a \qquad (18)$$

$$= \sum_{k=1}^{N/M} \hat{C}_k \cdot Q_k^a + \sum_{k=1}^{N/M} \hat{C}_{k+\frac{N}{M}} \cdot Q_{k+\frac{N}{M}}^a + \cdots +$$

$$\sum_{k=1}^{N/M} \hat{C}_{k+\frac{(M-1)N}{M}} \cdot Q_{k+\frac{(M-1)N}{M}}^a$$

$$= \sum_{n=1}^{M} \left\{ \sum_{k=1}^{N/M} \hat{C}_{k+\frac{(n-1)N}{M}} \cdot Q_{k+\frac{(n-1)N}{M}}^a \right\}$$

$$= \sum_{n=1}^{M} Q_n^b$$

Since addition is a linear process, simply dividing the summation into sub-intervals does not provide any benefit. However, recursively applying the traditional table method to each of the sub-intervals can account for the larger frequency error. Specifically, consider the individual $I_n^b$ and $Q_n^b$ terms $$I_n^b = \sum_{k=1}^{N/M} \hat{C}_{k+\frac{(n-1)N}{M}} \cdot I_{k+\frac{(n-1)N}{M}}^a \qquad (19)$$

$$= \sum_{k=1}^{N/M} A_{k+\frac{(n-1)N}{M}} \cdot C_{k+\frac{(n-1)N}{M}} \cdot \hat{C}_{k+\frac{(n-1)N}{M}} \cdot$$

$$\cos\left(2\pi \delta f T_s \left(k + \frac{(n-1)N}{M}\right) + 2\pi \delta f_T T_s \left(k + \frac{(n-1)N}{M}\right) + \delta \varphi\right)$$

$$= \sum_{k=1}^{N/M} A_{k+\frac{(n-1)N}{M}} \cdot C_{k+\frac{(n-1)N}{M}} \cdot \hat{C}_{k+\frac{(n-1)N}{M}} \cdot$$

$$\cos\left(2\pi(\delta f + \delta f_T)T_s k + 2\pi(\delta f + \delta f_T)T_s \frac{(n-1)N}{M} + \delta \varphi\right)$$

$$\approx A \cdot R(\delta \tau) \cdot \frac{\sin\left(\pi (\delta f + \delta f_T) T_s \frac{N}{M}\right)}{\pi (\delta f + \delta f_T) T_s} \cdot$$

$$\cos\left(\pi(\delta f + \delta f_T)T_s \frac{N}{M} + 2\pi(\delta f + \delta f_T)T_s \frac{(n-1)N}{M} + \delta \varphi\right)$$

$$= A \cdot R(\delta \tau) \cdot \frac{\sin\left(\pi (\delta f + \delta f_T) T_s \frac{N}{M}\right)}{\pi (\delta f + \delta f_T) T_s} \cdot$$

$$\cos\left(2\pi \delta f T_s \frac{N}{M} n - \pi \delta f T_s \frac{N}{M} + \pi \delta f_T T_s \frac{(2n-1)N}{M} + \delta \varphi\right)$$

$$Q_n^b = \sum_{k=1}^{N/M} \hat{C}_{k+\frac{(n-1)N}{M}} \cdot Q_{k+\frac{(n-1)N}{M}}^a \qquad (20)$$

$$= \sum_{k=1}^{N/M} A_{k+\frac{(n-1)N}{M}} \cdot C_{k+\frac{(n-1)N}{M}} \cdot \hat{C}_{k+\frac{(n-1)N}{M}} \cdot$$

$$\sin\left(2\pi \delta f T_s \left(k + \frac{(n-1)N}{M}\right) + 2\pi \delta f_T T_s \left(k + \frac{(n-1)N}{M}\right) + \delta \varphi\right)$$

$$= \sum_{k=1}^{N/M} A_{k+\frac{(n-1)N}{M}} \cdot C_{k+\frac{(n-1)N}{M}} \cdot \hat{C}_{k+\frac{(n-1)N}{M}} \cdot$$

$$\sin\left(2\pi(\delta f + \delta f_T)T_s k + 2\pi(\delta f + \delta f_T)T_s \frac{(n-1)N}{M} + \delta \varphi\right)$$

$$\approx A \cdot R(\delta \tau) \cdot \frac{\sin\left(\pi (\delta f + \delta f_T) T_s \frac{N}{M}\right)}{\pi (\delta f + \delta f_T) T_s} \cdot$$

$$\sin\left(\pi(\delta f + \delta f_T)T_s \frac{N}{M} + 2\pi(\delta f + \delta f_T)T_s \frac{(n-1)N}{M} + \delta \varphi\right)$$

$$= A \cdot R(\delta \tau) \cdot \frac{\sin\left(\pi (\delta f + \delta f_T) T_s \frac{N}{M}\right)}{\pi (\delta f + \delta f_T) T_s} \cdot$$

$$\sin\left(2\pi \delta f T_s \frac{N}{M} n - \pi \delta f T_s \frac{N}{M} + \pi \delta f_T T_s \frac{(2n-1)N}{M} + \delta \varphi\right)$$

For notational convenience, let $$S = A \cdot R(\delta\tau) \cdot \frac{\sin\left(\pi(\delta f + \delta f_T)T_s\frac{N}{M}\right)}{\pi(\delta f + \delta f_T)T_s} \text{ such that} \quad (21)$$

$$I_n^b = S \cdot \cos\left(2\pi\delta f T_s \frac{N}{M} n - \pi\delta f T_s \frac{N}{M} + \pi\delta f_T T_s \frac{(2n-1)}{M} + \delta\varphi\right)$$

$$Q_n^b = S \cdot \sin\left(2\pi\delta f T_s \frac{N}{M} n - \pi\delta f T_s \frac{N}{M} + \pi\delta f_T T_s \frac{(2n-1)}{M} + \delta\varphi\right) \quad (22)$$

These values can then be rotated by $$\pi\delta f_T T_s \frac{(2n-1)N}{M}$$

to remove the effect of the table frequency error $$\tilde{I}_n^b = I_n^b \cdot \cos\left(\pi\delta f_T T_s \frac{(n-1)N}{M}\right) + Q_n^b \cdot \sin\left(\pi\delta f_T T_s \frac{(2n-1)N}{M}\right) \quad (23)$$

$$= S \cdot \cos\left(2\pi\delta f T_s \frac{N}{M} n - \pi\delta f T_s \frac{N}{M} + \delta\varphi\right)$$

$$\tilde{Q}_n^b = -I_n^b \cdot \sin\left(\pi\delta f_T T_s \frac{(2n-1)N}{M}\right) + Q_n^b \cdot \cos\left(\pi\delta f_T T_s \frac{(2n-1)N}{M}\right) \quad (24)$$

$$= S \cdot \sin\left(2\pi\delta f T_s \frac{N}{M} n - \pi\delta f T_s \frac{N}{M} + \delta\varphi\right)$$

Substituting these values back into equations (17) and (18) yields $$I_k^b = \sum_{n=1}^{M} \tilde{I}_n^b \quad (25)$$

$$= \sum_{n=1}^{M} S \cdot \cos\left(2\pi\delta f T_s \frac{N}{M} n - \pi\delta f T_s \frac{N}{M} + \delta\varphi\right)$$

$$\approx S \cdot \frac{\sin\left(\pi\delta f T_s \frac{N}{M} M\right)}{\pi\delta f T_s \frac{N}{M}} \cdot \cos\left(\pi\delta f T_s \frac{N}{M} M - \pi\delta f T_s \frac{N}{M} + \delta\varphi\right)$$

$$= S \cdot \frac{\sin(\pi\delta f T_s N)}{\pi\delta f T_s \frac{N}{M}} \cdot \cos\left(\pi\delta f T_s N - \pi\delta f T_s \frac{N}{M} + \delta\varphi\right)$$

$$Q_k^b = \sum_{n=1}^{M} \tilde{Q}_n^b \quad (26)$$

$$= \sum_{n=1}^{M} S \cdot \sin\left(2\pi\delta f T_s \frac{N}{M} n - \pi\delta f T_s \frac{N}{M} + \delta\varphi\right)$$

$$\approx S \cdot \frac{\sin\left(\pi\delta f T_s \frac{N}{M} M\right)}{\pi\delta f T_s \frac{N}{M}} \cdot \sin\left(\pi\delta f T_s \frac{N}{M} M - \pi\delta f T_s \frac{N}{M} + \delta\varphi\right)$$

$$= S \cdot \frac{\sin(\pi\delta f T_s N)}{\pi\delta f T_s \frac{N}{M}} \cdot \sin\left(\pi\delta f T_s N - \pi\delta f T_s \frac{N}{M} + \delta\varphi\right)$$

After substituting in the full expression for S the final output from the correlator is thus given by $$I^b = A \cdot R(\delta\tau) \cdot \frac{\sin\left(\pi(\delta f + \delta f_T)T_s\frac{N}{M}\right)}{\pi(\delta f + \delta f_T)T_s} \cdot \quad (27)$$

$$\frac{\sin(\pi\delta f T_s N)}{\pi\delta f T_s \frac{N}{M}} \cdot \cos\left(\pi\delta f T_s N - \pi\delta f T_s \frac{N}{M} + \delta\varphi\right)$$

$$Q^b = A \cdot R(\delta\tau) \cdot \frac{\sin\left(\pi(\delta f + \delta f_T)T_s\frac{N}{M}\right)}{\pi(\delta f + \delta f_T)T_s} \cdot \quad (28)$$

$$\frac{\sin(\pi\delta f T_s N)}{\pi\delta f T_s \frac{N}{M}} \cdot \sin\left(\pi\delta f T_s N - \pi\delta f T_s \frac{N}{M} + \delta\varphi\right)$$

Finally, comparing the above equations with the rigorous values from equations (11) and (12) shows two differences: The attenuation factor is now comprised of two separate components. However, with "proper" selection of M, the overall attenuation can be limited to acceptable values. The argument into the final sine or cosine terms is slightly different. However, these differences arise from the mathematical development used (note the approximately-equal-to sign in many of the equations). Rigorously computing the solution yields identical terms to what is shown in equations (11) and (12).

Computational Complexity

An analysis of computational complexity of an embodiment of the invention discloses the following. The Doppler removal stage is mathematically unchanged from the prior art schemes, with the major difference that it only needs to be performed once for all communications signal sources (e.g., satellites). In terms of correlation, the first lines in equations (19) and (20) require 2N multiplications and 2N additions (recall that this operation needs to be performed for each of the M sub-intervals). Equations (23) and (24) require four multiplications and two additions. Over M intervals, this yields 4M multiplications and 2M additions. Finally, equations (25) and (26) require 2M additions. The total number of computations required for tracking K signal sources using L correlators is summarized in Table 2.

TABLE 2

Number of Computations Required For New Method Doppler Removal and Correlation (Assuming K signal sources and L Correlators per signal source)

| Process | Multiplications | Additions |
|---|---|---|
| Doppler Removal | 4N | 2N |
| Correlation | (2N + 4M)KL | (2N + 2M + 2M)KL |

As a quick comparison, assuming N=5000 (e.g., $f_s$=5 MHz and $T_s N$=1 ms), M=50, K=6 and L=3, Table 3 summarizes the total number of computations (Doppler removal and correlation) and the percent improvement of the new method relative to the prior art table method.

TABLE 3

Comparison of Total Computations Required For Table Method and New Method (N = 5000, M = 50, K = 6 and L = 3)

| Operations | Table Method | New Method | Improvement |
| --- | --- | --- | --- |
| Multiplications | 300,072 | 203,600 | 32.1% |
| Additions | 240,036 | 193,600 | 19.3% |
| Total | 540,108 | 397,200 | 28.3% |

Figure 4:
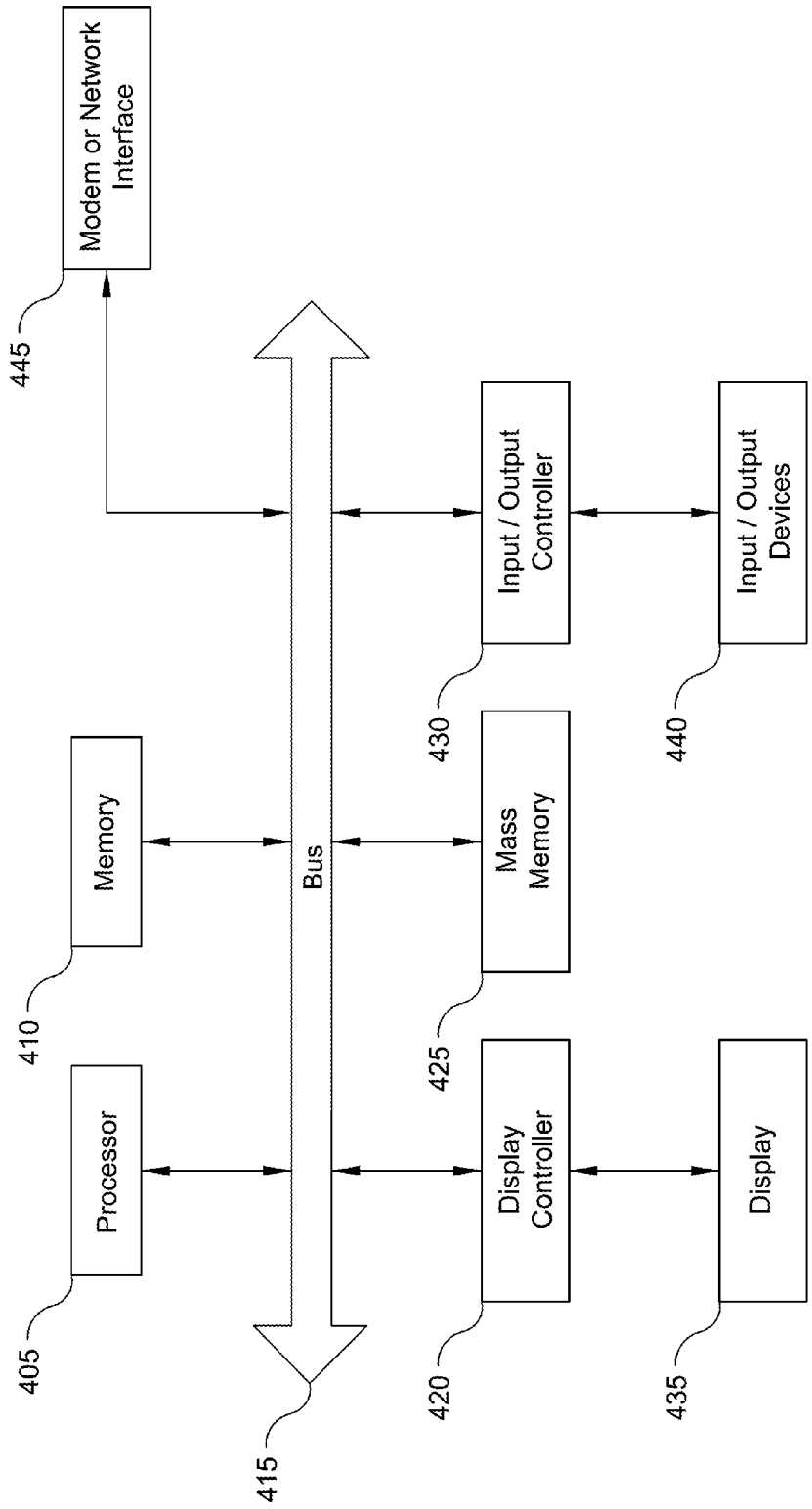
FIG. 4 illustrates a functional block diagram of a digital processing system that may be used to communicate data in accordance with one embodiment of the invention.

As discussed above, embodiments of the invention may employ DPSs or devices having digital processing capabilities. FIG. 4 illustrates a functional block diagram of a digital processing system that may be used in accordance with one embodiment of the invention. The components of processing system 400, shown in FIG. 4 are exemplary in which one or more components may be omitted or added. For example, one or more memory devices may be utilized for processing system 400. Referring to FIG. 4, the processing system 400, shown in FIG. 4, may be used as a server processing system. Furthermore, the processing system 400 may be used to perform one or more functions of a communications signal receiver system in accordance with an embodiment of the invention. The processing system 400 may be interfaced to external systems through a network interface or modem 445. The network interface or modem may be considered a part of the processing system 400. The network interface or modem may be an analog modem, an ISDN modem, a cable modem, a token ring interface, a satellite transmission interface, a wireless interface, or other interface(s) for providing a data communication link between two or more processing systems. The processing system 400 includes a processor 405, which may represent one or more processors and may include one or more conventional types of processors, such as Motorola PowerPC processor or Intel Pentium processor, etc. A memory 410 is coupled to the processor 405 by a bus 415. The memory 410 may be a dynamic random access memory (DRAM) and/or may include static RAM (SRAM). The processor 405 may also be coupled to other types of storage areas/memories (e.g. cache, Flash memory, disk, etc.), that could be considered as part of the memory 410 or separate from the memory 410.

The bus 415 further couples the processor 405 to a display controller 420, a mass memory 425 (e.g. a hard disk or other storage which stores all or part of the application 145, or stored digital content, depending on the DPS). The network interface or modem 445, and an input/output (I/O) controller 430. The mass memory 425 may represent a magnetic, optical, magneto-optical, tape, and/or other type of machine-readable medium/device for storing information. For example, the mass memory 425 may represent a hard disk, a read-only or writeable optical CD, etc. The display controller 420 controls, in a conventional manner, a display 435, which may represent a cathode ray tube (CRT) display, a liquid crystal display (LCD), a plasma display, or other type of display device. The I/O controller 430 controls I/O device(s) 440, which may include one or more keyboards, mouse/trackball or other pointing devices, magnetic and/or optical disk drives, printers, scanners, digital cameras, microphones, etc.

The processing system 400 represents only one example of a system, which may have many different configurations and architectures and which may be employed with the present invention. For example, various manufacturers provide systems having multiple busses, such as a peripheral bus, a dedicated cache bus, etc. On the other hand, a network computer, which may be used as a processing system of the present invention, may not include, for example, a hard disk or other mass storage device, but may receive routines and/or data from a network connection, such as the network interface or modem 445, to be processed by the processor 405. Similarly, a portable communication and data processing system, which may employ a cellular telephone and/or paging capabilities, may be considered a processing system that may be used with the present invention. However, such a system may not include one or more I/O devices, such as those described above with reference to I/O device 440.

In the system 400 shown in FIG. 4, the mass memory 425 (and/or the memory 410) may store data that may be processed according to the present invention. For example, the mass memory 425 may contain a database storing previously determined configuration information in accordance with one embodiment of the invention. Alternatively, data may be received by the processing system 400, for example, via the network interface or modem 445, and stored and/or presented by the display 435 and/or the I/O device(s) 440. In one embodiment, data may be transmitted across a data communication network, such as a LAN and/or the Internet.

Embodiments of the invention provide for Doppler removal and correlation with reduced computational costs and comparable performance as compared with prior art methods. A tracking performance analysis of an embodiment of the invention is included as Appendix A.

General Matters

Embodiments of the invention provide methods and systems to effect Doppler removal and correlation for software-based receivers. For one embodiment of the invention Doppler removal is performed concurrently for all received communications signals. For one such embodiment of the invention, a single frequency Doppler removal lookup table is generated, multiple communications signals having Doppler frequency shift are received from corresponding communications signal sources, and a Doppler removal process is performed concurrently for each received communication signal.

Although embodiments of the invention have been described in the context of signal tracking, it will be apparent to those skilled in the art that embodiment the technology is also applicable to the signal acquisition process. However, in this case, the benefit of the algorithm is that, with the same amount of computational resources, the number of frequency bins that can be searched in a given amount of time effectively increases.

Many alternative embodiments of the invention are possible. For example, the equations for the correlation process discussed above assume that each of the M sub-intervals are of the same length. In alternative embodiments the M sub-intervals may be of different lengths. Moreover, for alternative embodiments, the number of sub-intervals could be different amongst the different channels. Practically, this means that M could be selected for each communications signal source (e.g., on a satellite-by-satellite basis for a GNSS) depending on the value of $\delta f_T$. Since the computational savings of the proposed method are more significant for smaller values of M, this is obviously advantageous.

Further, although inventive concepts have been described for various embodiments of the invention in the context of GNSS, it will be appreciated that embodiments of the invention are applicable to any communications systems employing spread spectrum technology and requiring Doppler reduction/removal. For example, alternative embodiments of the invention provide Doppler removal in cellular telecommunications systems employing a spread spectrum technology (e.g., code division multiple access (CDMA)). In cellular networks using CDMA a base station is receiving communications signals from multiple mobile user terminals. The user terminals are transmitting concurrently at the same frequency. Doppler frequency shift and oscillator instabilities may cause each user terminal signal to be received by the base station at a slightly different frequency. Embodiments of the invention may be employed to effect Doppler removal and correlation for multiple mobile user terminals concurrently. That is, in the context of the inventive concepts as discussed above, the cellular network base station is analogous to the GNSS receiver and the mobile user terminals are analogous to the GNSS satellites.

Embodiments of the invention include various operations such as communicating, buffering, and processing data. For various embodiments, one or more operations described may be added or deleted.

The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. Embodiments of the invention may be provided as a computer program product that may include a machine-readable medium having stored thereon instructions, which may be used to program a computer (or other electronic devices) to perform a process according to the invention. The machine-readable medium may include, but is not limited to, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

Further, though described for various embodiments in specific context, embodiments of the invention are applicable to a variety of single channel or multi-channel data transfer systems employing multiple data standards.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

APPENDIX A

A series of simulations were run to analyze the performance of an embodiment of the inventive method in terms of tracking performance (not computational efficiency), relative to the prior art rigorous approach. In order to obtain a reasonable estimate of performance, the signal-to-noise ratio (SNR) was varied over a 10 dB range. This SNR reflects the SNR for any given IF sample (i.e., pre-correlation). For each assumed value of SNR, 10,000 simulation runs were executed with the following parameters:

- Sample frequency: 5 MHz
- Intermediate frequency: 8.4 MHz
- Integration time: 1 ms
- Initial phase: 45°
- Frequency tracking error: 0 Hz
- Table error: 5 kHz
- Number of sub-intervals: 50
- Chip-spacing: 0.5 chips (E/P and P/L)
- PRN: 1 (no code Doppler simulated)

It is noted that only one satellite signal is simulated. As such, the computational advantage of the inventive method is not apparent and is therefore not evaluated in this simulation. Rather, the purpose of the simulation is to evaluate the overall performance of the inventive method and algorithm.

Other important simulation parameters include:

- Assumed ATAN2 phase discriminator
- Assumed normalized early-minus-late code discriminator As shown by the results below, the differences between the rigorous and an embodiment of the inventive approach are generally negligible suggesting that the proposed method is feasible for practical application.

Power Results

Since the proposed algorithm has a different attenuation factor relative to the standard approach, the power loss relative to the rigorous implementation was computed. The average power loss across the 10,000 simulations is shown in Figure 1A as a function of SNR. As can be seen, the average power loss is on the order of 0.15 dB and is therefore negligible.

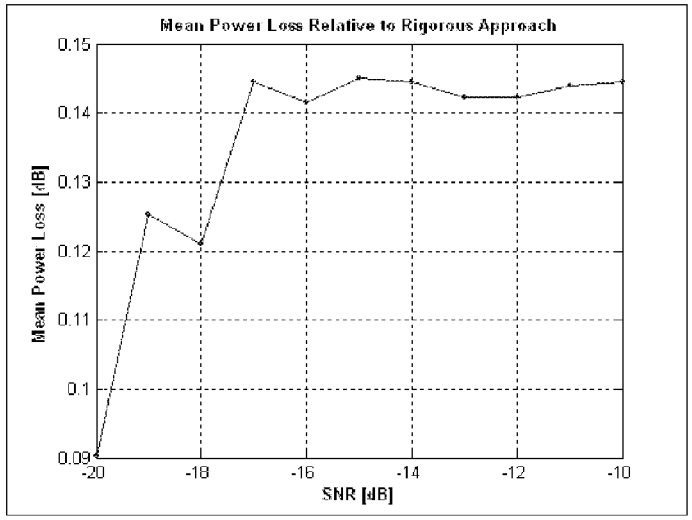

Figure 1A - Mean Power Loss of Proposed Method Relative to Rigorous Approach

Phase Tracking Performance

Figure 2:
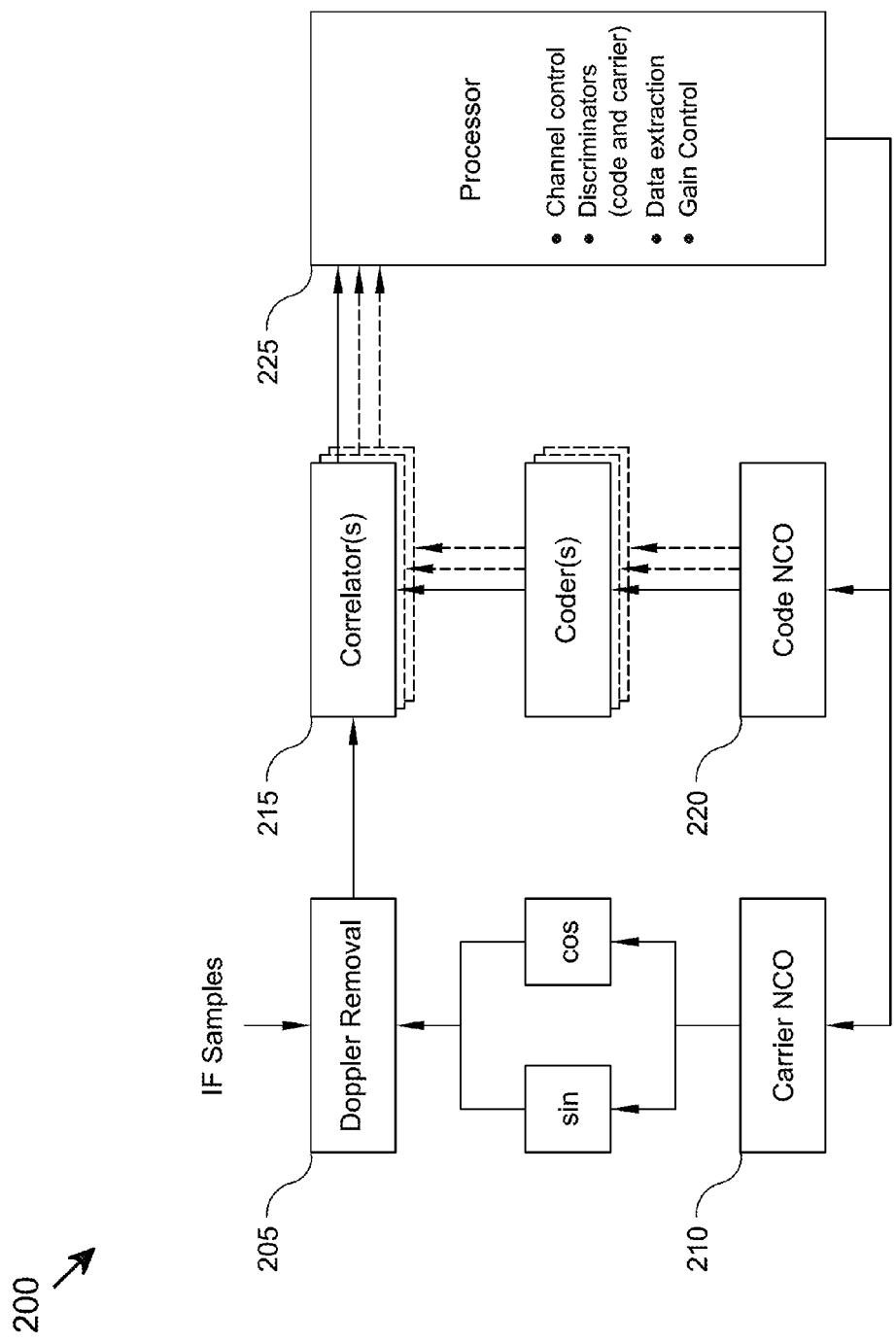
FIG. 2 illustrates a functional block diagram of a basic tracking channel in accordance with the prior art.

The next objective was to evaluate the phase tracking performance. This was approximated by computing the ATAN2 phase discriminator value as determined using the rigorous method and the proposed method, and comparing it to the known phase. The absolute mean of the phase errors on L1 for the two solutions is shown in Figure 2A. The differences between the solutions are minimal and well below the standard deviations of the discriminator values shown in Figure 3A.

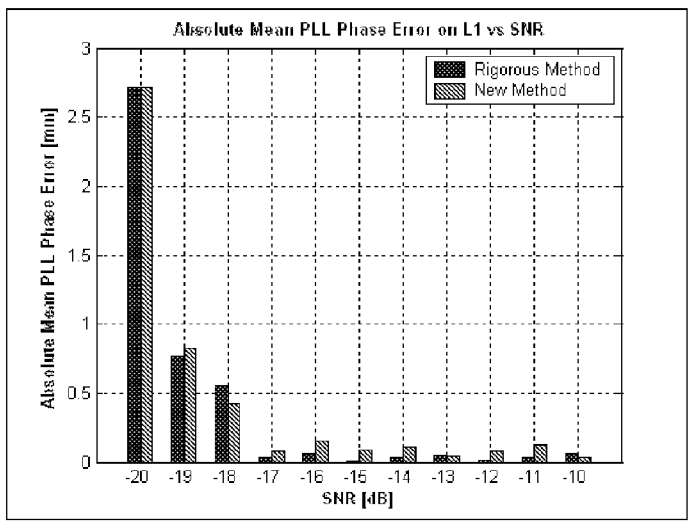

Figure 2A - Absolute Mean of Phase Discriminator Error on L1

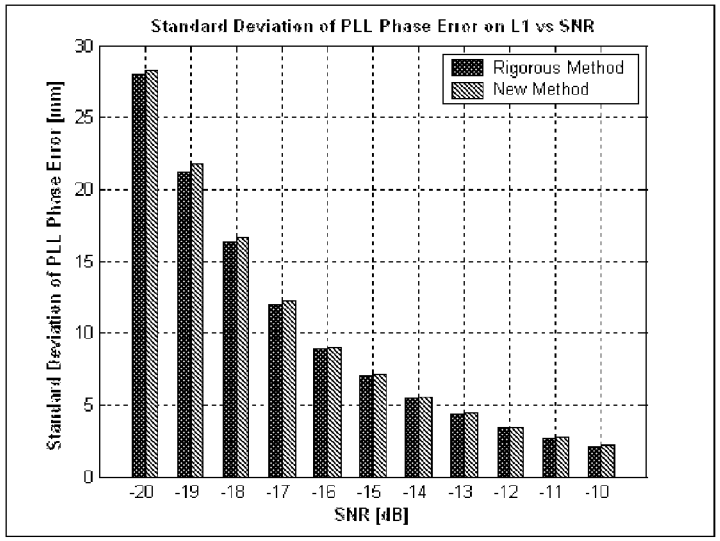

Figure 3A - Standard Deviation of Phase Discriminator Error on L1

Code Tracking Performance

The final step was to evaluate the code tracking performance using the new algorithm. To do this, an analogous approach as was used for the phase tracking evaluation was adopted. Using the normalized early-minus-late code discriminator, the absolute mean of the code errors are shown in Figure 4A. As with the phase, the differences in the code tracking error using the rigorous and proposed methods are small. Comparing the differences with the standard deviations in Figure 5A shows that the two approaches yield statistically identical results.

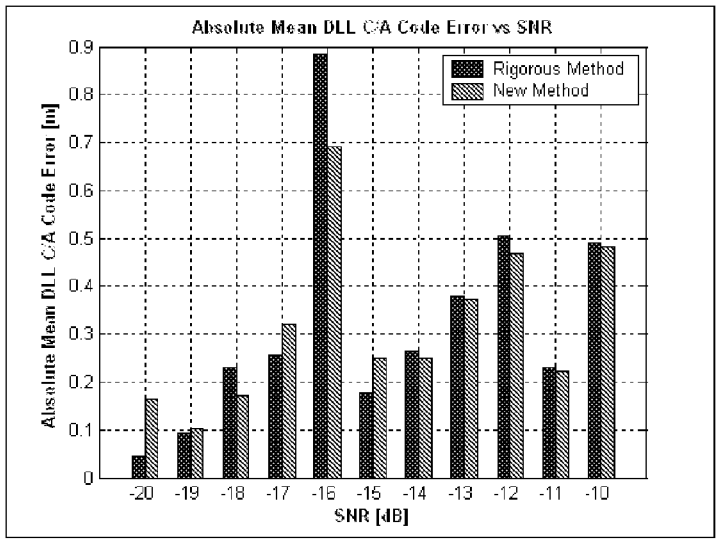

Figure 4A - Absolute Mean of Code Discriminator Error

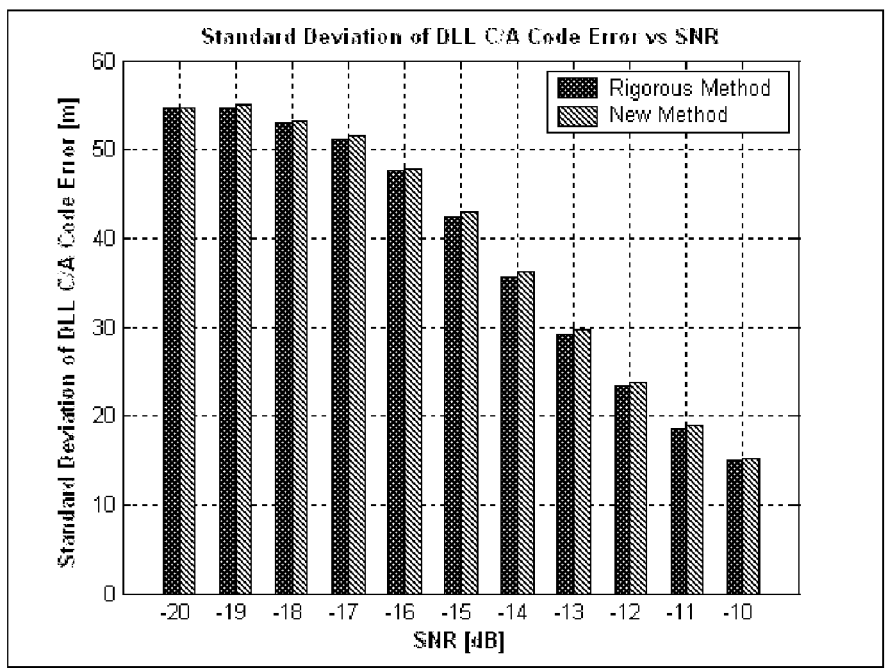
Figure 5A - Standard Deviation of Code Discriminator Error

What is claimed is:

1. A method comprising: selecting a single frequency to effect Doppler removal; receiving multiple communications signals having Doppler frequency shift from corresponding communications signal sources; performing a Doppler removal process using the selected single frequency, the Doppler removal process performed concurrently for each received communication signal; and performing a correlation process, the correlation process having an integration interval divided into multiple sub-intervals.

2. The method of claim 1 wherein a single frequency Doppler removal lookup table is created for the selected single frequency.

3. The method of the claim 1 wherein each of the received communications signals is a GNSS signal received from a corresponding satellite.

4. The method of claim 3 wherein performing a Doppler removal process includes downconverting each of the multiple received communications signals concurrently.

5. The method of the claim 1 wherein the selected single frequency is dynamically determined based upon a frequency of one or more of the multiple received communications signals.

6. The method of claim 1 wherein each of the multiple sub-intervals is the same length.

7. The method of claim 1 wherein the number of sub-intervals is determined independently for each of the communications signal sources.

8. An apparatus comprising: an antenna for receiving multiple communications signals having Doppler frequency shift from corresponding communications signal sources; and signal processing means for performing a Doppler removal process concurrently for each received communication signal, the Doppler removal process effected using a single selected frequency and performing a correlation process, the correlation process having an integration interval divided into multiple sub-intervals.

9. The apparatus of the claim 8 wherein a single frequency Doppler removal lookup table is created for the selected single frequency.

10. The apparatus of claim 8 wherein each of the received communications signals is a GNSS signal received from a corresponding satellite.

11. The apparatus of claim 10 wherein performing a Doppler removal process includes downconverting each of the multiple received communications signals concurrently.

12. The apparatus of the claim 9 wherein the selected single frequency is dynamically determined based upon a frequency of one or more of the multiple received communications signals.

13. The apparatus of claim 8 wherein each of the multiple sub-intervals is the same length.

14. The apparatus of claim 8 wherein the number of sub-intervals is determined independently for each of the communications signal sources.

15. A machine-readable medium that provides executable instructions, which when executed by a processor, cause the processor to perform a method, the method comprising: selecting a single frequency to effect Doppler removal; receiving multiple communications signals having Doppler frequency shift from corresponding communications signal sources; performing a Doppler removal process using the selected single frequency, the Doppler removal process performed concurrently for each received communication signal; and performing a correlation process, the correlation process having an integration interval divided into multiple sub-intervals.

16. The machine-readable medium of claim 15 wherein a single frequency Doppler removal lookup table is created for the selected single frequency.

17. The machine-readable medium of the claim 15 wherein each of the received communications signals is a GNSS signal received from a corresponding satellite.

18. The machine-readable medium of claim 17 wherein performing a Doppler removal process includes downconverting each of the multiple received communications signals concurrently.

19. The machine-readable medium of the claim 15 wherein the selected single frequency is dynamically determined based upon a frequency of one or more of the multiple received communications signals.

20. The machine-readable medium of claim 15 wherein each of the multiple sub-intervals is the same length.

21. The machine-readable medium of claim 15 wherein the number of sub-intervals is determined independently for each of the communications signal sources.

* * * * *